Patented Feb. 26, 1946

2,395,457

UNITED STATES PATENT OFFICE 2,395,457

LUBRICATING COMPOSITION

Gordon D. Byrkit, Niagara Falls, N. Y., assignor, by mesne assignments, to The Lubri-Zol Development Corporation, Cleveland, Ohio, a corporation of Delaware No Drawing. Application May 28, 1942, Serial No. 444,911

13 Claims. (Cl. 252—33.6)

My invention relates to an addition agent for lubricating oils and to an improved lubricating oil formed therefrom.

This application is a continuation in part of my copending application, Serial No. 226,966, filed August 26, 1938, now Patent No. 2,309,336 dated Jan. 26, 1943, which in turn was a continuation in part of Serial No. 87,464, filed June 26, 1936.

Present-day mechanical devices require lubricating oils of high film strength. It has been found that the highest quality straight hydrocarbon lubricants have a film strength insufficient for efficient use in present-day mechanical devices. High quality straight hydrocarbon lubricants used under conditions of high pressure, low speed and/or high temperatures, have a tendency to break down due to their low film strength. With high pressures between the rubbing surfaces, the body of the lubricant is squeezed out and only a thin film remains. It is readily seen that with a low film strength lubricant, there is a tendency for the lubricant to break down, decompose, and allow the rubbing surfaces to come in contact and cause seizure.

It is well known that mineral lubricating oils are deficient in oiliness, which is the most important character of the lubricant when used under conditions of boundary lubrication where the viscosity of the lubricant plays little or no part. Boundary lubrication conditions are obtained when engines are operating at heavy loads, low speed, or if for any reason the supply of lubricant is cut off or not sufficient. This last condition may exist when for mechanical reasons the lubricant pump is not functioning properly or when the lubricant feed line is clogged with foreign matter.

In starting idle mechanical equipment which is lubricated from a sump by pumping or circulating the lubricant, there is always a short period of time in which the rubbing surfaces must operate under conditions of dry friction if ordinary hydrocarbon lubricants are used. With dry friction the wear on friction surfaces is extreme; and during cold weather when the lubricant is sluggish or during periods when the lubricating system is not functioning properly for one reason or another, rubbing surfaces may not only suffer considerable wear but may be damaged to the point where they must be replaced. By means of my invention, it is possible to produce a material which when blended with hydrocarbon lubricants has the very important property of reacting with the metal surfaces, penetrating and/or adsorbing on the metal, leaving a film of lubricant with high oiliness characteristics, which remains on the metal surface irrespective of the length of time the machine has been idle. This high oiliness film gives very smooth operation, which may be easily discerned by the experienced operator and lubricating engineer.

One object of my invention is to provide materials which when added to mineral lubricating oils improve their oiliness and load-carrying ability and enable the oil to lower the friction between the rubbing surfaces.

Another object of my invention is to provide a material which when blended with the hydrocarbon oils will produce a lubricant which will maintain a very low coefficient of friction when diluted with light hydrocarbons such as are obtained in an automobile crankcase by incomplete combustion of the fuel.

A further object of my invention is to provide a material which when blended with hydrocarbon lubricants will confer upon it penetrative lubricity characteristics. It has been found that by my process a lubricant is produced which does not drain off the rubbing surfaces when idle, thereby providing a lubricating film on the rubbing surfaces at all times and being of great value to the life of the machine in cold-weather starting when the lubricant is very stiff and sluggish.

A still further object of my invention is to provide a material which when blended with a lubricant enables it to produce a more nearly constant coefficient of friction, thereby insuring smoother engine operation.

It is well known to the art that the addition of certain chlorinated or otherwise halogenated organic materials to mineral lubricants improves the character of the latter in these various respects. For example, U. S. Patent 1,944,941, issued to Bert H. Lincoln and Alfred Henriksen on January 30, 1934, describes a lubricating oil comprising in combination a hydrocarbon oil and a small quantity of certain halogenated esters, which improve the oiliness and load-carrying ability of the mineral oil, confer upon it penetrative lubricity characteristics and enable it to reduce the coefficient of friction between rubbing surfaces.

I have found that material excellently suited for the purpose of improving these characteristics of hydrocarbon oil is the halogen-bearing material which may be obtained by the interaction of various halogenated materials with salts of organic acids. The halogenated organic materials are preferably selected from those which contain one or more long chain hydrocarbon radicals, such radicals desirably having at least ten carbon atoms. The organic acid salts referred to above will usually be metallic salts and of these the alkali metal salts such as those of sodium and potassium are preferred. Salts of other metals, such as those of the alkaline earth metals may also be used. The salts used will also desirably be anhydrous.

The halogen may be present in the product because of residual halogen introduced with the halogenated material and not removed by the reaction with the anhydrous metal salt, and/or because the particular anhydrous metal salt selected to be reacted with the organic acid contains halogen and/or because halogen is introduced into the product in a separate and distinct halogenation reaction subsequent to the formation of the product.

These halogen-bearing products are preferred to the halogen-free products because of superior lubricating characteristics which the former confer upon the lubricants containing such products including higher film strength, resistance to the formation of harmful deposits and sludge, and the like.

The properties of the esters contemplated hereby for use as addition agents in lubricants which render them particularly suitable for this use as compared with esters generally are their complexity and their compatibility with lubricating oils. The complexity results from the nature of their preparation since the halogen-containing constituent of the condensation reaction may have the halogen attached to the organic material at a variety of points, or it may result from the halogenation process which may follow the condensation reaction. In either case, the range of products resulting is such that all of the molecular structures produced are suitable for this use rather than being of such widely different character as to include substances which would be undesirable. The nature of the radical which is a part of the chlorinated wax or other material used as one constituent of the condensation reaction is such as to enhance the compatibility of the product with lubricating oils. This is particularly so when the chlorinated material is derived from petroleum.

The chlorinated or otherwise halogenated wax may be prepared from hydrocarbon paraffin wax or from naturally occurring ester-like waxes such as carnauba wax or from synthetic wax-like esters such as octadecyl stearate. Such materials as these may be chlorinated or otherwise halogenated by direct treatment with the halogen at ordinary or elevated temperatures.

In the prior art, references are made to monochloro paraffin, dichloro paraffin, trichloro paraffin and the like as if these products were the result of direct chlorination of paraffins to the desired chlorinated product. I have found these materials are crude mixtures of chlorinated hydrocarbons and invariably contain unchlorinated hydrocarbons, monochlorinated hydrocarbons, dichlorinated hydrocarbons, and polychloro hydrocarbon derivatives. For example, a so-called "trichloro paraffin wax" containing 24 per cent chlorine, which corresponds closely to the percentage of chlorine in the trichloro compound, was separated by means of crystallization from acetone. The least soluble portion consisted of unchlorinated wax. The next least soluble portion consisted of a mixture of monochloro wax and unchlorinated wax. The percentage of unchlorinated wax in the original mixture was found to be 7.2 per cent. Thus, even in a "trichloro paraffin" so-called of the prior art, there is a large percentage of unchlorinated wax and quantities of monochlorinated wax and dichlorinated wax, besides trichlor wax and more highly chlorinated waxes.

In carrying out the method of my invention, the use of a crude mixture of halogenated waxes will not give the same results as a substantially pure halogenated wax. Even though the appropriate amount of halogen, specifically chlorine, is introduced into a wax to form a monochloro wax, the crude chlorination mixture will contain, in addition to small amounts of chlorine and hydrogen chloride and the desired monochlor wax, unchlorinated wax and more highly chlorinated waxes.

I have found that, on introducing chlorine into the higher paraffin hydrocarbons as, for example, paraffin wax, the formation of the di- and higher poly-chlor waxes begins when only 5 per cent by weight of chlorine has been introduced into the paraffin hydrocarbon. This formation of di- and higher poly-chlor waxes proceeds more rapidly than the chlorination of the hydrocarbon to the monochlor compound so that the proportion of the latter in a crude chlorinated mixture decreases rapidly and is at a maximum when about 10 per cent of chlorine has been introduced. At this point, a typical chlorinated mixture will contain about 25–30 per cent of unchlorinated wax, 40–50 per cent of monochlor wax, and about 20–25 per cent of dichlor wax, as well as higher chlorinated waxes. Even when as much as 24 per cent by weight of chlorine is introduced into a paraffin wax, about 10 per cent of unchlorinated hydrocarbon is still present in the mixture.

The removal of unchlorinated hydrocarbons from the crude chlorinated mixture is the first step in preparing relatively pure mono-halogen compounds and higher halogenated compounds, but it will be obvious that the chlorine compounds, when separated from the unchlorinated hydrocarbon, form a crude mixture of hydrocarbons in various stages of chlorination. The other halogens react the same way that chlorine reacts. It is impossible to directly obtain any relatively pure homogeneously halogenated wax by merely halogenating wax. To obtain the halogenated wax, which is an essential component of this invention, a special processing step must be employed.

The halogenation of most petroleum hydrocarbons lowers their melting points; and, to a certain degree, the greater the extent of halogenation, that is, the more halogen atoms per molecule, the lower the melting point. The decrease in melting point is stepwise. This permits me to separate halogenated hydrocarbons from the monohalo hydrocarbons, the monohalo hydrocarbons from the dihalo hydrocarbons, and the dihalo hydrocarbons from the trihalo hydrocarbons.

Having selected the hydrocarbon in accordance with the desired final product, I halogenate the hydrocarbons until approximately that amount of halogen is absorbed which will produce monohalo compounds, if these are desired, or larger amounts of halogen to produce di-, and higher poly-halo hydrocarbons when these products are desired. For example, in the manufacture of a monochloro hydrocarbon containing 18–24 carbon atoms per molecule, I select a paraffin wax having a melting point of approximately 120° F. I introduce into this wax about 10 per cent of added chlorine which will form a mixture containing as an average about the same weight of chlorine as the monochlor product. This may vary from not less than 8 to not more than 12 per cent without being disadvantageous. The percentage of chlorine introduced into the hydrocarbon will be less in the case of the higher molecular weight, higher melting hydrocarbons. The chlorination may be accomplished by any suitable method and any appropriate apparatus.

I prefer to melt the wax and agitate thoroughly while the chlorine gas is introduced into contact therewith so as to be well distributed through the liquid. The heat of reaction is ordinarily ample to maintain the mixture in the liquid state without further heating. I make provision for the escape of quantities of hydrogen chloride gas which are evolved and for unreacted chlorine. When a sufficient quantity of chlorine has been introduced, I blow the mixture with air or other inert gas such as carbon dioxide until the hydrogen chloride and free chlorine are substantially removed.

Even though the appropriate amount of chlorine is introduced into the wax to form a monochlor wax, as I have pointed out above, it will be found that the crude chlorination mixture contains in addition to the by-product hydrogen chloride and the desired monochlor wax, also unchlorinated wax and more highly chlorinated waxes.

The unchlorinated wax is separated from the air-blown mixture by pressing at such temperature that the chlorinated waxes are largely liquid and the unchlorinated wax is mostly solid. The appropriate temperature to which the mixture must be chilled before the pressing operation begins will depend upon the character of the hydrocarbon used initially and may vary considerably. For example, when a wax having a melting point of 120° F. is used as the starting material, a temperature of about 80-90° F. is suitable for the separation of unchlorinated wax from the mixture.

Other separation processes, for example, sweating, may be employed to separate the solid, halogenated wax from the liquid halogenated waxes.

The liquid halogenated waxes will consist largely of monohalo wax and dihalo wax. These may be separated by crystallization from acetone or any other suitable solid, using a solvent-chlor wax ratio of from 1 to 1 to 20 to 1. The solution is prepared by warming and is then chilled to approximately −15° to −20° F. to precipitate the halogenated waxes which are then removed by filtering, pressing, settling, or in any other suitable manner.

The monohalo wax is precipitated out of the solution nearly quantitatively, and its separation from the dihalo and polyhalo waxes present is readily accomplished.

Instead of acetone, such selective solvents as methyl-ethyl ketone, acetone-benzene mixtures, acetone-methylene chloride mixtures, or various halogenated solvents may be employed. It will be obvious that the quantity of solvent and the temperature to which the solution should be chilled will depend upon the particular materials being processed and may be readily determined empirically. The halogenated solvents serve to aid in the precipitation of unhalogenated waxes while benzene increases the solubility of the more highly halogenated materials.

The above separation by means of solvents and chilling was carried out on several samples which had been chlorinated to the theoretical monochloro stage. The monochlor wax thus obtained was found to contain approximately the theoretical chlorine content. Various batches show chlorine contents of 10.1, 10.5, 10.3, and 10.8 per cent. The theoretical chlorine content is 10.2 per cent so that it will be apparent that the monochlor wax obtained is substantially free from unchlorinated waxes and highly chlorinated waxes. The monochlor wax was found to behave very much like a pure compound. I proved the homogeneity of my monochlor wax, for example, by chilling until approximately half of the material had solidified. Solid and liquid portions were separated by filtration and contained 12.1 and 11.4 per cent chlorine respectively. My monochlor wax is therefore free from both unchlorinated wax and more highly chlorinated wax. Similarly, I may prepare according to my invention di- and poly-chloro waxes free from unchlorinated wax and monochlor wax as well as more highly chlorinated waxes.

Any of the relatively pure halogenated waxes may be used in carrying out my invention. A selected one of these waxes is condensed with the anhydrous metal salt of an organic acid in producing a product which may be used either directly or after halogenation as the addition agent of the compounded lubricants of my invention.

The organic acid may be of any type, that is, aliphatic, aromatic, or heterogeneous, and may belong to more than one of these classes. The following table gives representative examples of various organic acids which may thus be employed:

(a) Fatty acids such as the following:
    Acetic acid
    Chlor acetic acid
    Propionic acid
    Chlor propionic acid
    Butyric acid
    Oxalic acid
    Lactic acid
    Succinic acid
    Tartaric acid
    Stearic acid
    Palmitic acid
    Lauric acid
    Dichlorstearic acid
    Oleic acid
    Ricinoleic acid (b) Cycloaliphatic acids, such as:
    Napthenic acids
    Hexahydrobenzoic acid
    Alkylated hexahydrobenzoic acids
        Lauryl hexahydrobenzoic acid
        Cetyl hexahydrobenzoic acids
    Hexahydrosalicylic acid
    Hexahydrophthalic acid
    Alkylated hexahydro-phthalic acids
        Lauryl hexahydro-phthalic acids
        Dilauryl hexahydro-phthalic acids
        Cetyl hexahydro-phthalic acids
        Dicetyl hexahydro-phthalic acids c) Aromatic substituted fatty acids, such as:
    Phenyl acetic acids
    Phenyl propionic acids
    Phenyl stearic acid
    Chlorphenyl stearic acid
    Tolyl stearic acid
    Xylyl stearic acid
    Xenyl stearic acid
    Naphthyl stearic acid
    Phenoxy phenyl stearic acid
    Benzoyl phenyl stearic acid
    Hydroxy phenyl stearic acid
    Chlor phenyl stearic acids
    Phenyl palmitic acid (d) Aromatic acids
    Benzoic acid
    Monochlor benzoic acids
    Dichlor benzoic acids
    Salicylic acid Monochlor salicylic acids
Phthalic acid
Monochlor phthalic acids
Tetrachlor phthalic acids
(e) Aliphatic and cycloaliphatic substituted aromatic acids such as the following:
Dilauryl benzoic acids
Naphthenyl benzoic acids
Dicyclohexyl benzoic acids
Di(methyl cyclohexyl) benzoic acids
Naphthenoyl benzoic acids
Stearoyl benzoic acids
Alkylated phthalic acids
Lauryl phthalic acids
Dilauryl phthalic acids
Cetyl phthalic acids
Dicetyl phthalic acids
Monoceryl ester of phthalic acid In the foregoing table it will be observed that I have indicated that the halogen or more specifically chlorine bearing derivatives of certain of the named acids may be employed, and in this connection, it should be noted that any of the named acids may be halogenated and used as one of the reagents in the preparation of addition agents which are particularly efficient in improving the characteristics of mineral lubricating oil when blended with them. The halogenated acid will be selected as one of the starting materials when, as hereinafter pointed out for example, it is desired that the halogen in the end product be in the acid radicle.

The chosen organic acid is converted to the sodium or other metallic salt by means of neutralization with a suitable base, such as sodium hydroxide, barium hydroxide, etc., and rendered anhydrous by intensive drying or, if necessary, fusion.

The condensation products are of several types depending on the structure of the starting materials:

I. Esters from monohalogen compounds:
A. Esters from monohalogenated hydrocarbons.
The monohalogenated hydrocarbons which may be used with a selected anhydrous metal salt of an organic acid in producing this type of ester are represented by the following:
 1. Monochloroparaffin wax
 2. Monochloro-decane
 3. Monochloro-pentane
 4. Monochloro-gasoline hydrocarbons
 5. Monochloro-kerosene hydrocarbons
These end-products are esters of the type $RCO_2R'$ derived from the metal salt, $RCO_2M$, and the halogenated hydrocarbon, $R'X$, where M represents a metal; X represents a halogen. These esters hydrolyze to form an acid and an alcohol.
B. Di-esters from mono-halogenated esters.
These are of three types depending on the position of the halogen.
 1. Halogen in the acid radical.
These esters are of the type, $RCH(O \cdot CO \cdot R')(CH_2)_nCO_2R''$, derived from the metal salt $R'COOM$ and the monochloro-ester, $RCHCl(CH_2)_nCO_2R''$. R may be H or an organic radical; n may be zero or any integer. These esters are distinguished in that they hydrolyze to form an alcohol, $R''OH$, an acid, $R'CO_2H$, and a hydroxy acid, $RCHOH(CH_2)_n CO_2H$. Examples of mono-halogenated esters which may be used are:
 a. Octadecyl alpha-bromostearate
 b. Monochloro-carnauba wax
 c. Monochloro-beeswax
 2. Halogen in the alcohol radical.
These esters are of the type, $RCO_2R'O \cdot CO \cdot R''$, derived from the metal salt $R''CO_2M$ and the monochloro-ester, $RCO_2R'X$ in which R' is a divalent organic radical. These esters are distinguished in that they hydrolyze to form two acids, $RCO_2H$ and $R''CO_2H$ and a glycol, $R'(OH)_2$ which may be vicinal or disjoined depending on the position of the halogen. Examples of mono-halogenated esters which may be used are:
 a. Beta-chloroethyl stearate
 b. Monochloro-octadecyl stearate
 c. Monobromo-carnauba wax
 3. Halogen in both the acid and alcohol radicals.
These esters may be derived by means of condensation reactions in which both the reagents are halogen-containing and wherein the condensation reaction is carried out so as to leave residual halogen on the long chain aliphatic material such as paraffin wax.

II. Esters from di-halogen compounds
A. Esters from di-halogenated hydrocarbons
 1. When both halogen atoms are involved in the reaction:
These esters are of the type, $(RCO_2)_2R'$, in which $RCO_2$ is the radical derived from the metal salt, $RCO_2M$, and R' is a divalent organic radical derived from the di-halogenated hydrocarbon, $R'Cl_2$. These esters are distinguished in that they hydrolyze to form an acid, $RCO_2H$, and a ketone if both halogen atoms in $R'Cl_2$ are on the same carbon atom; an acid and a vicinal glycol if the halogens are on adjoining carbon atoms; and an acid and a disjoined glycol if the halogens are on disjoined carbon atoms.
Examples of di-halogenated hydrocarbons which may be used are:
 1. 3, 3-dichlorodecane
 2. 2, 3-dichlorodecane
 3. 1, 10,dichlorodecane
 4. Dichloroparaffin wax
 5. Dibromo-gasoline hydrocarbons
 6. Dichloro-kerosene hydrocarbons
 2. When only one halogen atom is involved in the reaction and the second halogen atom remains in the product, the esters are of the type, $RCO_2R'Cl$. These esters will hydrolize to form an acid $RCO_2H$ and a halogen-containing alcohol

B. Esters from di-halogenated esters
When both halogen atoms are involved in the reaction:
These are of three classes containing several types depending on the position of the halogen atoms.
 1. Both halogens in the alcohol radical
These esters are of the type, $RCO_2R'(O \cdot CO \cdot R'')_2$ in which R' is a trivalent organic radical. The esters are derived from the dichloro-esters $RCO_2R'Cl_2$. These esters are distinguished in that they hydrolyze to form two acids, $RCO_2H$ and $R''CO_2H$, and a trihydroxy organic compound $R'(OH)_3$ or a hydroxyketone. Examples of dihalogenated esters which may be used are:
 a. 2,2-dichloroethyl stearate
 b. Dichloro-carnauba wax
 c. Dichloro-candelilla wax
 2. Both halogens in the acid radical
These esters are of the type, $(RCO_2)_2$-$R'CO_2R''$, in which R' is a trivalent organic radical. The dichloro-esters from which these are derived have the formula $R'Cl_2 \cdot CO_2R''$. These esters are distinguished in that they hydrolyze to form an alcohol, $R''OH$, an acid, $RCO_2H$, and a dihydroxy-acid $R'(OH)_2CO_2H$ or a keto-acid if both halogens were originally on the same carbon atom. Examples of dihalogenated esters which may be used are:
 a. Methyl alpha, alpha-dichlorostearate
 b. Dichloro-beeswax
 c. Dibromo spermaceti
 d. Methyl alpha, beta-dichlorostearate
 e. Ethyl cinnamate dibromide
 f. Methyl alpha, iota-dichlorostearate
 3. One halogen in each radical
These esters are of the type,

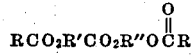

in which R' and R'' are divalent organic radicals. The starting chloro-esters have the formula $R'Cl \cdot CO_2R''Cl$. These esters are distinguished in that they hydrolyze to form an acid, $RCO_2H$, a hydroxyacid, $R'(OH)CO_2H$, and a glycol, $R''(OH)_2$ which may be vicinal or disjoined depending on the position of the original halogen atoms. Examples of di-halogenated esters which may be used are:
 a. Beta-chloroethyl alpha-chlorostearate
 b. Gamma-chloropropyl iota-chlorostearate
 c. Dichloro-candelilla wax
Where only one halogen atom is involved in the reaction the products will be of the same type as those derived from mono-halogenated esters except that the product will contain one atom of halogen, e. g.

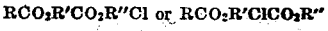

III. Esters from poly-halogen compounds.

The products of our invention may derive their halogen content from a plurality of sources, that is, from either or both of the starting materials, or by direct halogenation of the reaction product.

The halogen compound may, during the condensation reaction, lose all or only part of its halogen. Furthermore, the acid whose sodium or other metal salt is used in the condensation reaction may or may not itself contain halogen. Halogen from this latter source will remain in the final product. For example, I may use sodium o-chloro-benzoate as a reagent or I may use a chlor-wax containing 23 per cent halogen and treat it with insufficient quantities of metal salt or for insufficient time or at too low a temperature to remove all the halogen from the halogenated wax.

The addition agents containing residual halogen are particularly suited for use in lubricants used in hypoid gears and in crankcases of internal combustion engines. The residual halogen increases the polarity of the molecule which has an improving effect upon the oil in which it is blended. In order to obtain substantially halogen-free esters as final products which are then subsequently halogenated before use, I treat my halogen compound at a sufficiently high temperature for a sufficient time with a suitable excess of a halogen-free sodium salt as described below.

For use in lubricating oils, it is desirable that the compounds employed should have a vapor pressure of less than atmospheric at a temperature of about 250° F. Compounds having this vapor pressure will not vaporize during use in an internal combustion engine or as a crankcase lubricant.

The condensation of the chlorinated wax with the anhydrous salt, for example, the anhydrous sodium salt, is preferably effected by heating these two components in the presence of small amounts of an acid anhydride and a tertiary base, such as pyridine or dimethylaniline. If the organic acid used is cheaply available in the form of the anhydride, that anhydride is preferably used as a condensing agent; thus, for example, if acetic acid is used to prepare the anhydrous sodium salt, then acetic anhydride is preferably used as the condensing anhydride; however acetic or any other cheaply available acid anhydride is suitable to effect the condensation.

The use of a tertiary base such as pyridine or dimethylaniline serves to increase the rate of reaction between the components so as to effect the condensation in a shorter time. In general, the condensation is effected by heating the components to a temperature of from 100 to 200 degrees C., usually about 140 degrees C. for 8 to 16 hours; however in the presence of the tertiary base, the condensation is completed in a much shorter time; namely, from 4 to 8 hours at this temperature. The time and temperature conditions given above will be a sufficiently definite indication to those skilled in the art to carry out the condensation reaction involving the several named components. The time and temperature conditions given above as an illustration may be varied when using different reagents and also in accordance with the amount of residual halogen desired to be retained in the end product.

The condensation product or addition agent as thus prepared if no residual halogen is present therein may be halogenated to any desired extent, and for certain purposes a product thus prepared is preferable to that resulting from a condensation reaction carried on under such conditions that a certain amount of residual halogen remains.

In whatever way the addition agent is prepared, it will desirably be refined before use by washing with water and drying the same by suitable means, such as for example, blowing with air at an elevated temperature.

The addition agent may be used in a wide range of concentrations in the mineral oil base, the properties of which are to be improved. Generally, amounts on the order of .25% to 5% will be suitable for most uses, although amounts from about .1% to about 10% will be found to have general utility.

Where extreme conditions are to be encountered, the addition agent may be utilized in amounts from an effective amount up to about 20%. The term "effective amount" is used to denote that amount of the particular addition agent necessary in order to show a substantial increase in the extreme pressure properties of the mineral oil base to which the same is added.

Various types of lubricants are susceptible to treatment by this invention, including paraffin base, naphthenic base and/or asphaltic base hydrocarbon oils, and other oils of lubricating viscosity, such as animal and vegetable oils, namely, castor oil, sperm oil, cottonseed oil, lard oil, corn oil, and synthetic oils, including hydrogenated oils.

The viscosity of the oil base used will depend on the type of service for which the lubricant is designed. In general, a compounded lubricant made in accordance with my invention should have a viscosity for a particular use which is the same as that viscosity of a plain mineral lubricating oil used for the same purpose. For example, for most internal combustion engines of the usual automotive type, the viscosity will be within the S. A. E. 10, S. A. E. 20 and S. A. E. 30 ranges; while for heavy-duty and aviation engines higher viscosity ranges are sometimes used, for example the S. A. E. 40 and S. A. E. 50 ranges. Since the compositions of this invention are suitable for use as gear lubricants and for other heavy-duty purposes, the oil base selected for such purposes will be those conventionally used i. e. for gear lubricants used in automobile vehicles and the like the S. A. E. range will extend from about 80 to about 250, the oils falling within the more restricted range of from about 90 to about 140 being most generally used.

The highly refined mineral lubricating oils suitable for use as the base in the improved compositions of my invention may be conveniently classified in accordance with their viscosity index, three such classes being oils having a V. I. up to 30; oils having a V. I. from 30 to about 70; and oils having a V. I. of above 70. Obviously the oil base selected may contain appropriate constituents in addition to plain mineral oil such as pour point depressors and the like, since these conventionally employed materials have been found entirely compatible with the addition agents which characterize the final blends comprising my invention.

The following example of my invention is given to show one embodiment thereof, but it is to be understood that my invention is not limited thereto except in so far as pointed out in the claims. All quantities are given in parts by weight. One hundred thirty parts of a relatively pure monochlor wax were heated with 58 parts of the anhydrous sodium salt of chloracetic acid and 47 parts of free chloroacetic acid in the presence of five ml. of acetic anhydride and two ml. of pyridine at 140 to 150° C. for 6 hours. The resulting condensation product was washed with water and dilute sodium carbonate solution to remove free acids and dried by air blowing at 140° F. This condensation product when blended with 99 parts by weight of a hydrocarbon oil greatly improved the load carrying ability, oiliness and penetrative lubricity characteristics, and reduced the coefficient of friction between rubbing metal surfaces. The presence of chlorine in the condensation product was in part responsible for the extremely high increase in film strength and the reduction in the coefficient of friction.

While it is believed unnecessary to more specifically indicate particular condensation products prepared in the manner indicated above and the range of percentages within which the same may be used, nevertheless the following is submitted as an additional guide in the selection and mode of use of the materials comprising this invention.

|   | Parts by weight |
|---|---|
| 1. Mineral oil | 99.5 |
| Condensation product of monochlor paraffin wax with sodium chloracetate | 0.5 |
| 2. Mineral oil | 98 |
| Condensation product of monochlor wax with sodium dichlorstearate | 2 |
| 3. Mineral oil | 99 |
| Condensation product of monochlor wax with sodium dichlorbenzoate | 1 |
| 4. Mineral oil | 98 |
| Condensation product of monochlor wax with sodium chlornaphthenate | 2 |
| 5. Mineral oil | 99 |
| Condensation product of monochlor wax with sodium chlorsalicylate | 1 |
| 6. Mineral oil | 99 |
| Condensation product of monochlor wax with sodium chlorphenylstearate | 1 |
| 7. Mineral oil | 99 |
| Condensation product of monochlor paraffin wax with sodium dichlorphthalate | 1 |
| 8. Mineral oil | 99 |
| Condensation product of monochlor paraffin wax with sodium salt of monomethyl ester of dichlor-phthalic acid | 1 |

$$C_6H_2Cl_2\begin{matrix}COONa\\ COOCH_3\end{matrix}$$

| 9. Mineral oil | 99 |
|---|---|
| Condensation product of dichlor paraffin wax with sodium acetate (reacted under conditions such as to remove only approximately one atom of chlorine from the dichlor wax) | 1 |
| 10. Mineral oil | 99 |
| Condensation product of dichloro-kerosene hydrocarbon with sodium benzoate (reacted under conditions such as to remove only approximately one atom of Cl from the dichlor kerosene) | 1 |
| 11. Mineral oil | 99 |
| Condensation product of monochlor carnauba wax with sodium chlor acetate | 1 |
| 12. Mineral oil | 99 |
| Condensation product of monochlor carnauba wax with sodium chlorbenzoate | 1 |
| 13. Mineral oil | 99 |
| Condensation product of monochlor carnauba wax with sodium chlornaphthenate | 1 |
| 14. Mineral oil | 99 |
| Condensation product of monochlor beeswax with sodium chloracetate | 1 |
| 15. Mineral oil | 99 |
| Condensation product of beta-chloroethyl stearate with sodium chloracetate | 1 |
| 16. Mineral oil | 99 |
| Condensation product of beta-chloroethyl dichlorstearate with sodium acetate (reacted under conditions such as to remove only approximately one atom of Cl from the beta-chloro-ethyl dichlorstearate) | 1 |
| 17. Mineral oil | 99 |
| Condensation product of methyl dichlorstearate with sodium acetate (reacted under conditions such as to remove only approximately one atom of chlorine from the methyl dichlorstearate) | 1 |
| 18. Mineral oil | 99 |
| Condensation product of methyl dichlorstearate with sodium chloracetate | 1 |
| 19. Mineral oil | 99 |
| Condensation product of methyl dichlorstearate with sodium chlorbenzoate | 1 |
| 20. Mineral oil | 99 |
| Condensation product of monochlor paraffin wax with sodium acetate (the reaction product having been chlorinated until it contained about 20% of chlorine) | 1 |
| 21. Mineral oil (S. A. E. 90 gear oil) | 95 |
| Sulphurized methyl linoleate | 2 |
| Condensation product of mono-chlor paraffin wax with sodium chloracetate | 3 |

In the above examples, I have used a chlorinated material, but it is to be understood that any of the halogens are suitable in the preparation of my condensation products. For example, fluorine, bromine, or iodine may be used; but since chlorine is so cheaply available, it is the preferred embodiment of my invention.

It will be understood that certain features and subcombinations are of utility and may be employed without reference to other features and subcombinations. This is contemplated by and is within the scope of my claims. It is further obvious that various changes may be made in detail within the scope of my claims without departing from the spirit of my invention. It is therefore to be understood that my invention is not to be limited to the specific details shown and described.

Other modes of applying the principle of the invention may be employed, change being made as regards the details described, provided the features stated in any of the following claims, or the equivalent of such, be employed.

I therefore particularly point out and distinctly claim as my invention:

1. A lubricating composition comprising a major proportion of lubricating oil and a minor amount of a synthetic material obtained by condensing a homogeneous monochloro-wax with anhydrous sodium ortho-chlorobenzoate in the presence of acetic anhydride and pyridine.

2. A lubricating composition comprising a major proportion of lubricating oil and a minor amount of a halogen-bearing material obtained by condensing a halogenated wax with an anhydrous metal salt of an organic acid in the presence of an organic acid anhydride.

3. A lubricating composition comprising a major proportion of lubricating oil and a minor amount of a halogen-bearing material obtained by condensing a halogenated wax with an anhydrous salt of an organic acid in the presence of an organic acid anhydride.

4. A lubricating composition comprising a major proportion of lubricating oil and a minor amount of a halogen-containing material obtained by condensing a halogenated wax with an anhydrous salt of an organic acid in the presence of an organic acid anhydride and a tertiary base.

5. A lubricating composition comprising a major proportion of lubricating oil and a minor amount of a chlorine-containing material obtained by condensing a chlorinated wax with an anhydrous salt of an organic acid in the presence of an organic acid anhydride.

6. A lubricating composition comprising a major proportion of lubricating oil and a minor amount of a chlorine-containing material obtained by condensing a chlorinated wax with an anhydrous salt of an organic acid in the presence of an organic acid anhydride and a tertiary base.

7. A lubricating composition comprising a major proportion of a hydrocarbon oil and a minor amount of a synthetic halogen-containing material obtained by condensing a relatively pure homogeneously halogenated wax with an anhydrous halogen-containing metal salt of an organic acid in the presence of an organic acid anhydride.

8. A lubricating composition comprising a major proportion of a hydrocarbon oil and a minor proportion of a synthetic halogen-containing material obtained by condensing a relatively pure homogeneously halogenated wax with an anhydrous halogen-containing salt of an organic acid in the presence of an organic acid anhydride and a tertiary base.

9. A lubricating composition comprising a major proportion of lubricating oil and a minor amount of a synthetic halogen-containing material obtained by condensing a relatively pure homogeneously chlorinated wax with an anhydrous salt of an organic acid in the presence of an organic acid anhydride.

10. A lubricating composition comprising a major proportion of lubricating oil and a minor amount of a synthetic halogen-containing material obtained by condensing a relatively pure homogeneously halogenated wax with an anhydrous metal salt of an organic acid in the presence of an organic acid anhydride.

11. A lubricating composition comprising a major proportion of lubricating oil and a minor amount of a synthetic halogen-containing material obtained by condensing a relatively pure homogeneously halogenated wax with an anhydrous metal salt of an organic acid in the presence of an organic acid anhydride and a tertiary base.

12. A lubricating composition comprising a major proportion of lubricating oil and a minor amount of a synthetic halogen-containing material obtained by the condensation of a relatively pure homogeneously halogenated wax with an anhydrous metal salt of an organic acid in the presence of an organic acid anhydride and then halogenating the condensation product.

13. A lubricant comprising a lubricating oil solution of a material obtained by the condensation of a halogenated wax with an anhydrous salt of an organic acid in the presence of an organic acid anhydride and a tertiary base at a temperature from 100° C. to 200° C. for a period of from 4 to 8 hours.

GORDON D. BYRKIT.